Dec. 8, 1953  H. SCHUTTE  2,662,129
TROLLEY WIRE CLAMP
Filed Aug. 31, 1949  2 Sheets-Sheet 1
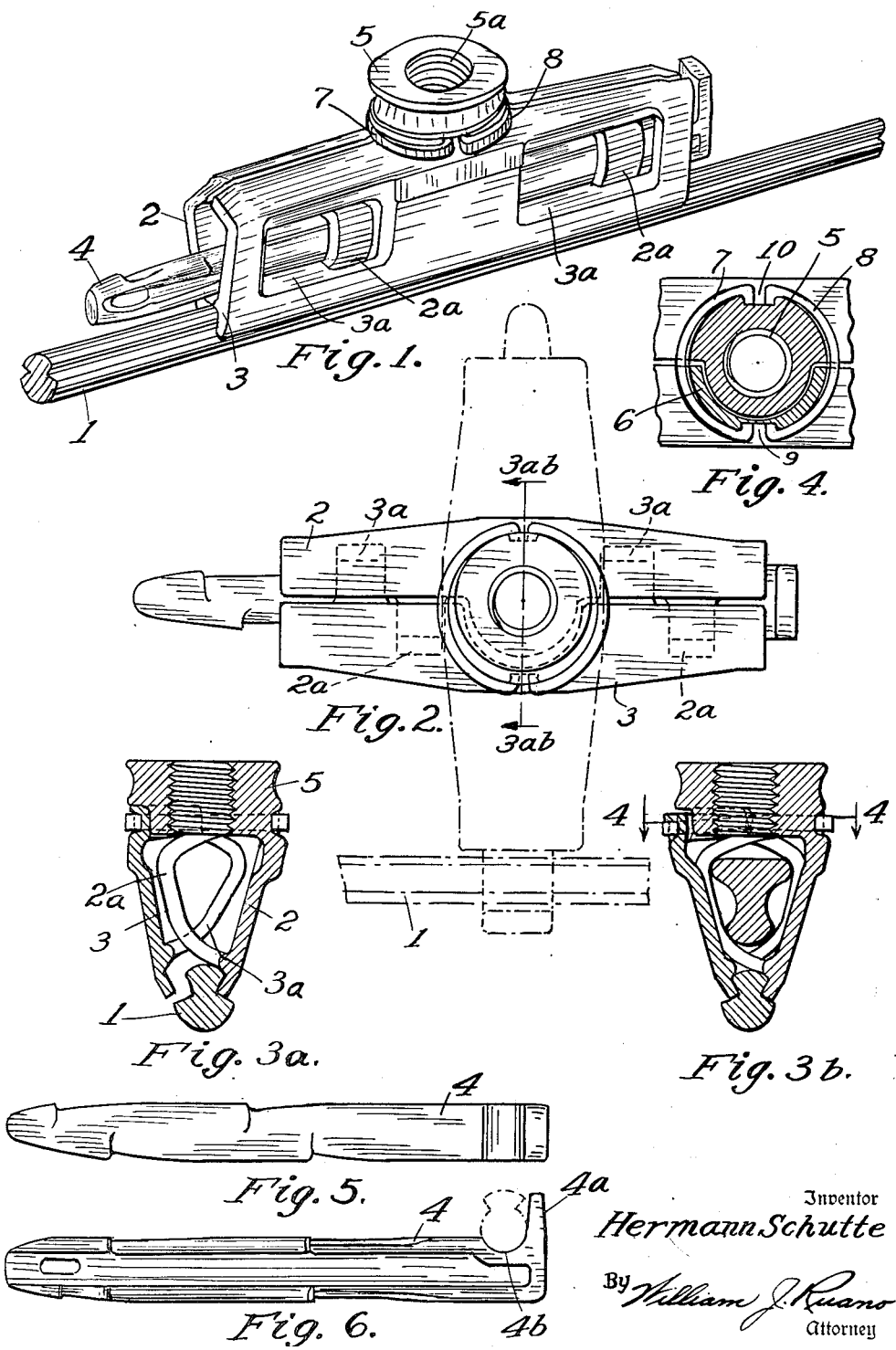
Inventor
Hermann Schutte
By William J. Ruano
Attorney Dec. 8, 1953     H. SCHUTTE     2,662,129
TROLLEY WIRE CLAMP
Filed Aug. 31, 1949     2 Sheets-Sheet 2
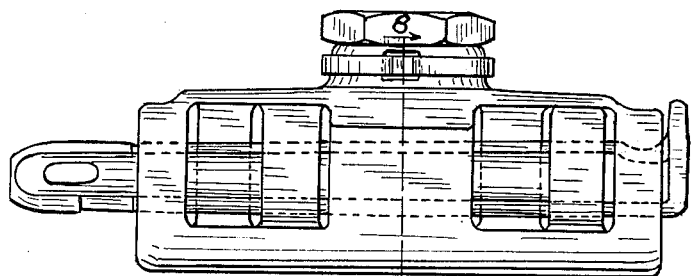
Fig. 7.
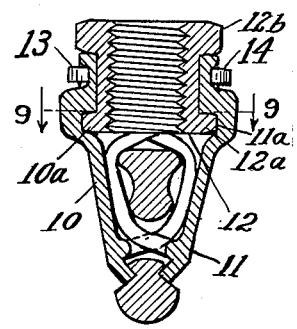
Fig. 8.
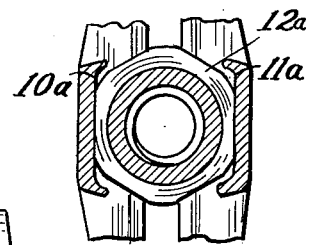
Fig. 9.
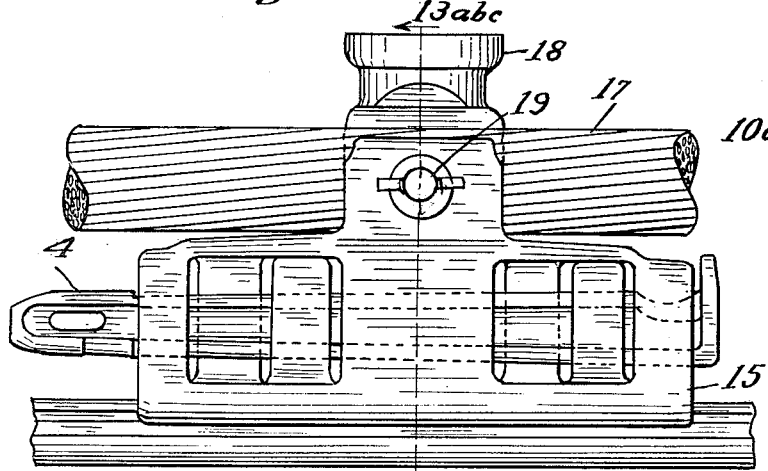
Fig. 12.
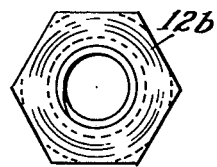
Fig. 10.
Fig. 11.
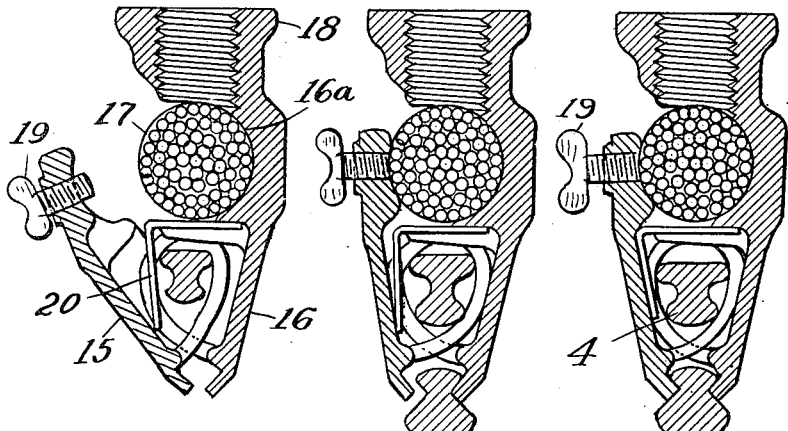
Fig. 13a.    Fig. 13b.    Fig. 13c.    Fig. 14.
Inventor
Hermann Schutte
By William J. Ruano
Attorney Patented Dec. 8, 1953

2,662,129

UNITED STATES PATENT OFFICE 2,662,129

TROLLEY WIRE CLAMP

Hermann Schutte, Pittsburgh, Pa.

Application August 31, 1949, Serial No. 113,288

5 Claims. (Cl. 191—43)

This invention relates, in general, to new and useful improvements in mechanical clamps or holders for trolley wires, commonly known as mine trolley clamps.

More specifically, the invention relates to improvements in mine trolley clamps of the type disclosed in my previous Patents No. 1,296,860 and No. 1,549,690, and to a new, useful, two-wire clamp version thereof suitable to serve as a combination feeder and trolley clamp.

A slight drawback of conventional wedge-type trolley clamps as disclosed in my aforesaid prior patents has been the tendency of the clamping jaws to close in, or draw together by the action of gravity before the trolley wire is inserted therebetween, thus making the placing of the trolley wire into the mouth of the clamp between the clamping jaws difficult as it becomes necessary to pry the jaws apart to facilitate receiving the wire. This is undesirable because oftentimes the workman requires both hands for handling the wire alone, or, in the case of the two wire clamp, the wire and the cable.

Another matter of some concern has been the tendency of the wedge to become dislodged from its confinement within the loop portions of the clamping jaws and thereby permit the clamp to become disassembled in handling. This condition becomes more serious when the clearances between the loop members of the clamping jaws and the wedge become slightly enlarged, whereby frictional contact between these parts becomes very unreliable for positively holding the parts together in their normal assembled relation without the complication of a separate means to do so.

A common source of disadvantage of two wire conventional screw type mine clamps is that the clamping jaws are simply provided at their lower extremities with an extra aperture close above the trolley wire gripping jaw lips whereby the two wires are held in very closely spaced parallel relationship, hence there is a tendency for the uppermost wire or feeder cable to touch and interfere with the trolley wire. Furthermore, such clamps make the installation of both wires so troublesome that two men are always required for this work.

A serious objection to another commonly used combination version of the two-wire screw clamp is the considerable extra height of this type clamp whereby the trolley wire is lowered beyond the practical limits in low ceiling mines.

The broad object of the present invention is to provide novel wedge type clamps for a trolley wire and a two-wire version thereof which will efficiently hold also an additional feeder cable which are devoid of the above-mentioned disadvantages of the clamps in common use for the respective purposes, with the presentation of an all purpose group of uniform wedge-type clamps so designed and arranged that the same standardized component parts may be used to advantage in the assembly of the different versions of clamps in the entire group, classified, for instance, as non-aligning, aligning, or two-wire clamps, respectively.

A more specific object of the invention is to provide a clamp for a trolley wire similar to the one disclosed in my Patent No. 1,549,690, with supplementary spring means for normally holding the clamping jaws in a spread apart position so as to more readily and easily receive a trolley wire therebetween for clamping engagement by the jaws.

Another specific object of this invention is to provide a novel clamp or holder for a trolley wire, which clamp is of the aligning type and is provided with a nut which may be turned from a hexagon bar so shaped at its lower end as to require only slight separation of the clamping jaws as the nut and clamp are relatively turned in angular relationship in order to align the clamp with respect to the trolley wire after the clamp has been screwed onto its supporting stud.

A further object of the invention is to provide a novel two-wire clamp for receiving and clamping both a trolley wire and a cable, and which is of such construction as to facilitate insertion of the wire or cable and to provide maximum distance between the trolley conductor and cable so as to avoid possible interference therebetween as a consequence of the travel of the trolley along the wire.

A further object of the invention is to provide in a clamp for a trolley wire, particularly of the aligning type, a key or wedge which is shaped as to serve as a temporary ledge or support for a trolley wire or cable immediately before insertion of the wire or cable into clamping position between the jaws.

Other objects and advantages of the invention will become apparent from a study of the following specification taken with the accompanying drawings wherein:

Fig. 1 is a perspective view of a clamp or holder for a trolley wire embodying the principles of my invention wherein the parts are shown in clamping position;

Fig. 2 is a plan or top view of the clamp shown in Fig. 1 showing in dash-and-dot lines the clamp in the position where the wedge serves as a temporary supporting means for the trolley wire to be installed;

Fig. 3a is a cross-sectional view taken along the line 3ab—3ab of Fig. 2 and showing the clamping jaws separated by spring means before insertion of the key or wedge;

Fig. 3b is a view similar to Fig. 3a taken along line 3ab—3ab, except that it shows the parts in clamping position after the clamping key or wedge has been inserted in place and driven home.

Fig. 4 is a cross-sectional view taken along line 4—4 of Fig. 3b;

Fig. 5 is a top or plan view of the clamping key or wedge shown in Figs. 1, 2 and 3b;

Fig. 6 is a side elevational view of the key or wedge shown in Fig. 5 more clearly illustrating the trolley wire supporting ledge portion;

Fig. 7 is a side elevational view of a modified form of clamp having an aligning feature;

Fig. 8 is a transverse cross-sectional view taken along line 8—8 of Fig. 7;

Fig. 9 is a cross-sectional view taken along line 9—9 of Fig. 8 more clearly showing the rounded corners of the bottom portion of the nut;

Fig. 10 is a top or plan view of the hexagonal nut shown in Figs. 7, 8 and 9;

Fig. 11 is an elevational view of the nut shown in Figs. 8, 9 and 10;

Fig. 12 is a side elevational view of still another modified form of clamp which is of the two-wire type, that is, for clamping two conductors, namely, the trolley wire and an electrical cable;

Fig. 13a is a transverse cross-sectional view taken along line 13abc—13abc of Fig. 12, showing the clamping jaws in an open position for facilitating insertion of the cable;

Fig. 13b is a cross-sectional view similar to Fig. 13a and taken along line 13abc—13abc of Fig. 12, but showing the parts in a clamping position with respect to the cable but in an open position with respect to the trolley conductor to facilitate insertion of the trolley conductor with the wedge or key in a retracted position;

Fig. 13c is a cross-sectional view similar to Fig. 13b except showing the key or wedge driven home so as to clamp both the cable and trolley wire, and Fig. 14 is a perspective view of the leaf spring shown in Figs. 12, 13a, 13b and 13c.

Referring more particularly to Figs. 1 and 2 of the drawings, numeral 1 denotes a trolley conductor which is adapted to be clamped between the clamping jaws or ears 2 and 3 of a clamp embodying the principles of the present invention. The clamping jaws have integral loops, such as 2a and 3a, which are movable substantially into axial alignment when a clamping key or wedge 4 is inserted through the interlocking loops, thereby drawing the clamping jaws 2 and 3 together into clamping engagement with the trolley wire in a well known manner. Clamping jaw 2 has integrally formed therewith a socket 5 which is internally threaded at 5a so as to receive a screw threaded stud extending from an insulator assembly (not shown) for supporting the clamp or holder. A semicircular collar 6 is integrally formed on clamping jaw 3 and cooperates with the lower semicircular cutout portion of socket 5 so as to form therewith a cylindrical boss. This boss is encircled by semicircular springs 7 and 8 whose ends are bent and extend radially inwardly into notches, such as 9 and 10, formed in socket 5 and collar 6, respectively, as shown more clearly in Fig. 4. Springs 7 and 8 tend to draw the semicircular collar 6 against the complementary part of the socket and in so doing hold the upper pivotal edges of the clamping jaw together, thereby spreading apart the lower portions, that is, the clamping jaws, as shown more clearly in Fig. 3a. In the absence of springs 7 and 8, the clamping jaws would tend to fall together, under the action of gravity, in closely spaced relationship so as to make it difficult to insert the trolley wire therebetween. However, with the springs 7 and 8 in place, the jaws are yieldingly held far apart, as shown in Fig. 3a, so as to easily receive the trolley wire. After the trolley wire is inserted between the jaws, the key or wedge is driven home through the loops, hence the clamping jaws are drawn together into clamping position, thereby firmly clamping the trolley wire in the manner shown in Fig. 3b.

Figs. 5 and 6 show a novel clamping key or wedge embodying a temporary support feature of the present invention in that it has integrally formed at one end thereof an upstanding portion 4a and, adjacent thereto, a slotted portion 4b for receiving the trolley wire, as shown in dotted lines in Fig. 6, before it is clamped between the jaws of the clamp. That is, when the trolley wire is first unreeled, it is difficult to insert the various lengths thereof directly between the jaws. It is highly advantageous to rest the unreeled parts of the wire on the slotted end portion 4b of the clamping key while the clamp is positioned as shown in dotted lines in Fig. 2, that is, at right angular relationship to the direction of the wire 1. After a predetermined length of trolley wire has been unreeled and stretched out for support on the various keys or wedges, the clamp may be turned 90°, that is, from the dash-and-dot line to the full line position shown in Fig. 2, and at the same time, the trolley wire is lifted from the key and inserted between the clamping jaws in the manner shown in Fig. 1.

Figs. 7 to 10, inclusive, show a modified form of clamp or holder for a trolley wire, which clamp is of the aligning type, that is, it provides ratcheting action between the socket and the clamping jaws. More specifically, referring to these figures, numerals 10 and 11 denote clamping jaws whose top portions are provided with somewhat semicircular recesses or faces 10a and 11a, which recesses are adapted to receive a hexagonal nut portion 12a of a nut 12, as shown in Figs. 8 and 9. At the top of the socket there is a hexagonal nut portion 12b which may be turned by a wrench in special cases so as to screw thread the socket onto a stud forming part of the insulator assembly (not shown). Ordinarily, however, the clamp is screwed onto the hanger stud by first driving home the wedge, thereby locking the parallel sides of the faces 10a and 11a of the socket portion of the clamping jaws 10 and 11 solid against the lower portion of nut 12 so that the clamp as a whole becomes solid with the nut and serves as a convenient handle for screwing up the nut on the hanger stud.

Subsequent loosening of the wedge to its retracted position releases the nut for unlimited rotation relative to the clamp body for its adjustment in alignment with the trolley wire. By this arrangement no wrench is required for the installation of the trolley wire, which is a most advantageous feature of wedge-type clamps. The internally threaded nut is screwed up until it firmly rests against the insulator (not shown), and thereafter, if the clamping jaws are not in alignment with the trolley conductor, they may be moved into alignment by releasing or retracting the wedge and turning the clamping jaws so they will slip between faces of the hexagonal nut portion 12a to provide a ratcheting action. Semicircular springs 13 and 14 encircle a grooved portion of the collar-like extension formed at the top of the clamping jaws for normally holding the pivotal edges of the clamping jaws together for biasing the clamping jaws in a spread apart condition to facilitate insertion of the trolley wire between the jaws. As the clamp is turned in order to align it with the trolley wire, there will be slipping between the confronting faces 10a and 11a of the clamping jaws and the hexagonal nut 12 to provide a ratcheting action. As diametrically opposite corners of the nut 12 come into engagement with faces 10a and 11a, they tend to spread them apart slightly, which spreading is yieldably resisted by springs 13 and 14. In fact, excessive spreading apart of these faces 10a and 11a is undesirable and made impossible due to the limited clearances between the inside faces of the loop members of the clamping jaws with the key even in its utmost retracted position, wherefore polygonally-shaped nuts of a few sides, such as hexagonal and square nuts, are not serving the purpose to best advantage.

One expedient for minimizing the amount of separation of these faces of the clamping jaws is to provide a polygonal nut with many sides, such as an octagonally-shaped nut. However, such shaped nuts are quite uncommon in practice and are difficult and expensive to manufacture. I have found that by rounding or cutting off the edges of a hexagonal nut, as shown in Fig. 9, the spreading or separation of the clamping jaws may be kept within practical limits and will give satisfactory operation. A hexagonal-shaped nut is highly desirable because it has a suitable number of faces for obtaining the desired aligning and ratcheting effect. By the provision of a hexagonal nut, there is provided a highly efficient aligning type of clamp which embodies spring biased, normally spread apart clamping jaws to facilitate insertion of the trolley conductor as explained hereinbefore.

Particular attention is called to the fact that clamping jaws 10 and 11 of the aligning type clamp shown in Fig. 7 are identical counterparts of clamping jaw 3 of the non-aligning clamp of Fig. 1. Furthermore, since the spring clips 7 and 8 of the clamp shown in Fig. 1 are also identical to clips 13 and 14 in Fig. 8 and the single wedge of Fig. 5 and Fig. 6 serves in all modifications of this invention, it is evident that, for instance, the assembly of the aligning type clamp of Fig. 7 calls for only a single new part, namely the nut of Fig. 12, in addition to the standard component parts of the non-aligning clamp of Fig. 1.

This provides for utmost economy in standardizing of parts inasmuch as it permits the assembly of different types of wedge type clamps from a minimum of different component parts in stock.

A further modification of the invention is shown in Figs. 12, 13a, 13b, 13c and 14. A two-wire type clamp is shown, that is, a clamp for clamping the trolley conductor and for additionally clamping a heavier electrical current carrying cable normally used in mines for tapping electrical appliances or tools inasmuch as the trolley wire normally is incapable of carrying sufficient current for operating, in addition to the trolley car, such accessories or tools.

Clamping jaws 15 and 16 are provided which are similar in construction to clamping jaws 2 and 3 of Fig. 1. The top of clamping jaw 16 has integrally formed a recess 16a for receiving a cable 17 and a socket 18 which is normally threaded for receiving a supporting screw threaded stud of an insulator assembly (not shown). At the top of jaw 15 there may be provided a screw threaded stud or set screw 19 for firmly pressing or clamping the cable when the jaws are in clamping position. It should be noted, however, that screw 19 may be omitted, if so desired, inasmuch as the clamping jaws when in the position shown in Figs. 13b and 13c are sufficiently close together to firmly hold the cable in place within the clamp. A somewhat L-shaped leaf spring 20, as shown in Fig. 14, is provided between the clamping jaws.

When the clamping jaws are in the position shown in Fig. 13a, they are open so as to readily allow insertion of the cable 17 in recess 16a. Spring 20 tends to keep the jaws in this open position. After the cable is inserted in place, the jaws are manually grasped and brought closer together, as shown in Fig. 13b, and the spring 20 now holds the bottom portions of the jaws in a spread apart position so as to facilitate insertion of the trolley conductor therebetween.

After insertion of the trolley conductor between the lower portions of the clamping jaws, the key or wedge 4 is driven home within the integral loops extending from the clamping jaws so as to draw the clamping jaws together into firm clamping engagement with the trolley wire as shown in Fig. 13c. The screw 19 may now be tightened so as to firmly secure the cable in place.

A highly important feature of such two-wire clamp is that the integral loops of the clamping jaws are disposed between the two wires instead of being disposed above the two wires as is conventional with screw type clamps. This allows maximum separation between the two wires and minimizes interference that might otherwise occur because of the very close spacing of the two wires. Thus when a trolley rolls along the trolley wire, it will not interfere with a hanging loop of the cable, therefore, there will be little or no tendency for derailing of the trolley as might otherwise occur as the result of interference by the cable due to the use of conventional types of screw clamps.

Thus it will be seen that I have provided a relatively simple, efficient and inexpensive type of clamp or holder for trolley conductors, which clamp includes spring means for normally spreading apart the clamping jaws to facilitate insertion of the trolley wire to be clamped therebetween; also, I have embodied such spring clamp in an aligning type of structure wherein a hexagonal nut with rounded edges provides the necessary ratcheting action between the clamping jaws for furnishing the self-aligning feature; furthermore, I have provided a novel two-wire type of clamp for clamping the trolley conductor and an electrical cable, which clamp is of a construction as to facilitate the installation of a trolley wire and feeder cable with the greatest of ease and at maximum speed, that is, by a single man as compared with two men as required for this work with older type clamps, and to provide maximum spacing between the trolley wire and cable to prevent the possibility of contacting therebetween or between a trolley and a loop or hanging portion of the cable.

While I have illustrated and described certain specific embodiments of my invention, it will be understood that these are by way of illustration only and that various changes and modifications may be made within the contemplation of my invention and within the scope of the following claims.

I claim:

1. A clamp for a trolley conductor comprising a pair of clamping jaws having trolley wire engaging portions, each jaw having integrally formed, inwardly extending loops, a key for insertion through said loops for causing them to become axially aligned and thereby draw the clamping jaws into clamping position, semicircular collar portions integrally formed at the top of each clamping jaw to form when in confronting relationship a boss, a pair of diametrically disposed notches formed in said boss, and a pair of semicircular-shaped spring elements, each having radially inwardly extending end portions which extend into said notches for normally biasing said trolley wire engaging portions of said jaws in spread apart condition to facilitate insertion of the trolley wire therebetween, said spring elements also being effective to yieldably clamp said key within said loops either when the key is in the retracted position or when driven home.

2. A trolley clamp as set forth in claim 1 together with a nut having a peripherally grooved central portion and two hexagonal end portions, the central portion adapted to be encircled by said semicircular collar portions, said clamping jaws having underneath said semicircular portions semicircular recesses for closely encircling the innermost of said hexagonal nut end portions, the other hexagonal end portion extending above said semicircular collar portions for engagement with a hanger, and for causing ratchet movement in increments of 60°.

3. Apparatus recited in claim 1 wherein said key has an upstanding end portion to prevent sliding off of a conductor when laid on said key when in the retracted position between the clamping jaws.

4. A clamp for a trolley wire, comprising a pair of clamping members having integrally formed loops, a clamping key adapted to be inserted through said loops for drawing said clamping members together into clamping engagement with the trolley wire, and an internally screw threaded central stem having a polygonal outer surface seated between upper flat socket portions of said clamping members, and spring means for holding the clamping members in assembled relationship with said central stem but allowing ratchet-like rotatable movements of the stem in the clamping members while said clamping key is in its retracted position, whereby the gripping portions of the clamping members are held normally separated under spring tension to facilitate receiving the trolley wire and prevent the key from being dislodged in handling by virtue of the spring action frictional contact of the loop portions of the clamping members with said key.

5. A conductor holder, comprising an upper internally screwthreaded central socket portion, for attaching the holder to a hanger stud, and two parallel body portions extending at right angles to said socket portion and longitudinally with respect to said conductor and having upper contacting edges forming a pivot for relative movement of said body portions, said body portions having at their lower extremities clamping jaw portions for clamping the conductor by viselike action, said body portions having integrally formed therewith longitudinally spaced, inwardly projecting loop portions which are adapted to be brought into registry to form a common central longitudinal passageway, a serrated wedge adapted to be inserted in said passageway, for locking said body portions together, a spring mounted on said central socket portion for spreading said jaw portions apart about said pivot as a center and for reducing the cross sectional area of said passageway and thus clamp and prevent dislodgement of said wedge and consequent disassembly of the holder when not in use, whereby said clamping jaws are resiliently held wide open to easily receive a conductor when the wedge is in the withdrawn position and whereby said clamping jaws firmly and securely clamp said conductor when said wedge is driven home through said passageway.

HERMANN SCHUTTE.

References Cited in the file of this patent

UNITED STATES PATENTS

| Number | Name | Date |
|---|---|---|
| 1,296,860 | Schutte | Mar. 11, 1919 |
| 1,549,690 | Schutte | Aug. 11, 1925 |
| 1,660,873 | Hines et al. | Feb. 28, 1928 |
| 2,366,467 | Anderson | Jan. 2, 1945 |
| 2,546,950 | Nixon | Mar. 27, 1951 |

FOREIGN PATENTS

| Number | Country | Date |
|---|---|---|
| 815,256 | France | Apr. 5, 1937 |